(12) United States Patent
Bonner et al.

(10) Patent No.: US 7,179,881 B2
(45) Date of Patent: Feb. 20, 2007

(54) PROCESS FOR HEATING PET PELLET FEED TO A SOLID STATING PROCESS BY HEAT EXCHANGE WITH HOT SOLID STATED PELLETS

(75) Inventors: Richard Gill Bonner, Kingsport, TN (US); A Bob Debenport, Columbia, SC (US)

(73) Assignee: Eastman Chemical Company, Kingsport, TN (US)

( * ) Notice: Subject to any disclaimer, the term of this patent is extended or adjusted under 35 U.S.C. 154(b) by 92 days.

(21) Appl. No.: 10/666,415

(22) Filed: Sep. 19, 2003

(65) Prior Publication Data
US 2005/0065315 A1 Mar. 24, 2005

(51) Int. Cl.
*C08G 63/02* (2006.01)
(52) U.S. Cl. ............... 528/272; 264/9; 264/14; 422/131; 528/271
(58) Field of Classification Search ............ 264/9, 264/14; 422/131; 528/271, 272
See application file for complete search history.

(56) References Cited

U.S. PATENT DOCUMENTS

| 4,436,782 A | * | 3/1984 | Ho ........................ 428/402 |
| 5,532,333 A | * | 7/1996 | Stouffer et al. ........ 528/308.2 |
| 5,597,891 A | | 1/1997 | Nelson et al. |
| 6,159,406 A | | 12/2000 | Shelby et al. |
| 2004/0113300 A1 | * | 6/2004 | Jurgens et al. ............ 264/9 |

OTHER PUBLICATIONS

International Search Report and Written Opinion.

* cited by examiner

*Primary Examiner*—Terressa Boykin
(74) *Attorney, Agent, or Firm*—Dennis V. Carmen

(57) ABSTRACT

Considerable energy savings may be realized by recovering heat from hot PET pellets exiting a solid state polymerization reactor, and using this heat to heat cool pellets entering the crystallizer or solid state polymerization reactor. The heat may be transferred from hot to cool pellets employing a heat exchanger.

16 Claims, 2 Drawing Sheets

PROCESS FOR HEATING PET PELLET FEED TO A SOLID STATING PROCESS BY HEAT EXCHANGE WITH HOT SOLID STATED PELLETS

BACKGROUND OF THE INVENTION

1. Field of the Invention

The present invention pertains to the commercial manufacture of polyethylene terephthalate ("PET") polymers.

2. Background Art

PET has numerous uses, principle among which are for films, fibers, and food containers. Despite the stringent matrix of properties required for such uses, particularly for food packaging, PET has become a commodity polymer. Commercial production of PET is energy intensive, and therefore even relatively small improvements in energy consumption are of considerable commercial value.

The production of PET (inclusive of copolymers) begins with an esterification step where the dicarboxylic acid component, predominantly terephthalic acid, is slurried in ethylene glycol and heated to produce a mixture of oligomers of a low degree of polymerization. This "esterification" step may be followed by a further "oligomerization" or "prepolymer" step, where a higher degree of polymerization is obtained. The product still has a very low molecular weight at this stage.

The previously described steps are then followed by a polycondensation. The polycondensation is catalyzed by metal compounds such as Sb, Ti, Ge, Sn, etc. Polycondensation occurs at relatively high temperature, generally in the range of 260–300° C., under vacuum, water and ethylene glycol produced by the condensation being removed. The polymer at the end of polycondensation has an inherent viscosity generally in the range of 0.4 to 0.65, corresponding to a molecular weight too low for many applications.

Commercial production of PET polyesters has required a subsequent post-polymerization in the solid state, termed "solid stating." In this stage of the process, the PET granules are heated in inert gas, preferably nitrogen, at temperatures below the melt temperature, i.e. from 210–220° C. in many cases. Solid stating is complicated by the fact that most PET polymers, following extrusion from the melt and pelletizing, are substantially amorphous. In order to prevent the pellets from sintering and agglomerating in the solid stater, the pellets are first crystallized over a period of 30 to 90 minutes at a lower temperature, e.g. 160–190° C., typically in a flow of inert gas. In should be noted that "solid stating" herein refers to the solid state polycondensation per se, and not to the combined processes of crystallization and solid state polycondensation. The esterification, melt phase polycondensation, crystallization, and solid state polycondensation steps are well known to those skilled in the art, as evidenced by U.S. Pat. Nos. 5,597,891 and 6,159,406.

In the conventional PET process, the pellets exiting from the solid stating reactor are cooled in air or nitrogen. The cooling gas may be directed through a cooler and reused, or may be passed only once through and vented. In either case, the thermal energy content of the gas goes unused. Moreover, when nitrogen is used as the cooling gas, the raw material cost is elevated, particularly in pass through coolers.

SUMMARY OF THE INVENTION

Thermal energy in hot polyethylene terephthalate pellets exiting a solid stating reactor may be recovered by heat exchanging the heat contained in the hot pellets with cool pellets which are to enter the solid stater. The energy penalty associated with heating of the cool pellets in the solid stater is thus eliminated.

DETAILED DESCRIPTION OF THE PREFERRED EMBODIMENT(S)

The esterification, oligomerization, and other process steps, including the crystallization portion of the polyethylene terephthalate production process may be those conventionally used, and are well known to those skilled in the art.

The PET polymers are prepared from terephthalic acid and ethylene glycol. While dimethylterephthalate may in principle be used as well as terephthalic acid, use of the latter is preferred. In addition, the PET polymers may contain up to 20 mol percent, preferably up to 10 mol percent, and more preferably no more than 5 mol percent of dicarboxylic acids other than terephthalic acid, and the same mol percentages of glycols (diols) other than ethylene glycol.

Examples of other suitable dicarboxylic acids which may be used with terephthalic acid are isophthalic acid, phthalic acid, naphthalene dicarboxylic acids, cyclohexane dicarboxylic acids, aliphatic dicarboxylic acids, and the like. This list is illustrative, and not limiting. In some cases, the presence of minor amounts of tri- or tetracarboxylic acids may be useful for generating branched or partially crosslinked polyesters. Isophthalic acid and naphthalene dicarboxylic acids are the preferred dicarboxylic acid when mixtures of acids are employed.

Examples of diols other than ethylene glycol which may be employed include, but are not limited to, 1,2-propane diol (propylene glycol), 1,3-propane diol (trimethylene glycol), diethylene glycol, triethylene glycol, dipropylene glycol, 1,4-butane diol, 1,6-hexanediol, neopentyl glycol, cyclohexane diol, and cyclohexanedimethanol. Preferred glycols other than ethylene glycol include diethylene glycol, and most preferredly, cyclohexanedimethanol ("CHDM"), the latter generally used as a mixture of isomers. In addition, polyols such as pentaerythritol, glycerine, and trimethylolpropane may be used in most minor quantities when branched or partially crosslinked polyesters are desired. Most preferably, only difunctional carboxylic acids and difunctional hydroxyl-functional compounds (glycols) are employed.

In conventional PET production, the pellets which are formed following polycondensation are cooled with water, dried, and stored in a pellet silo at a temperature of 20° C. to 30° C. prior to being introduced into the crystallizer. The crystallizer typically operates at 180° C., although some processes employ higher or lower temperatures as well. The crystallized pellets are then introduced into the solid stating reactor.

Figure 1:
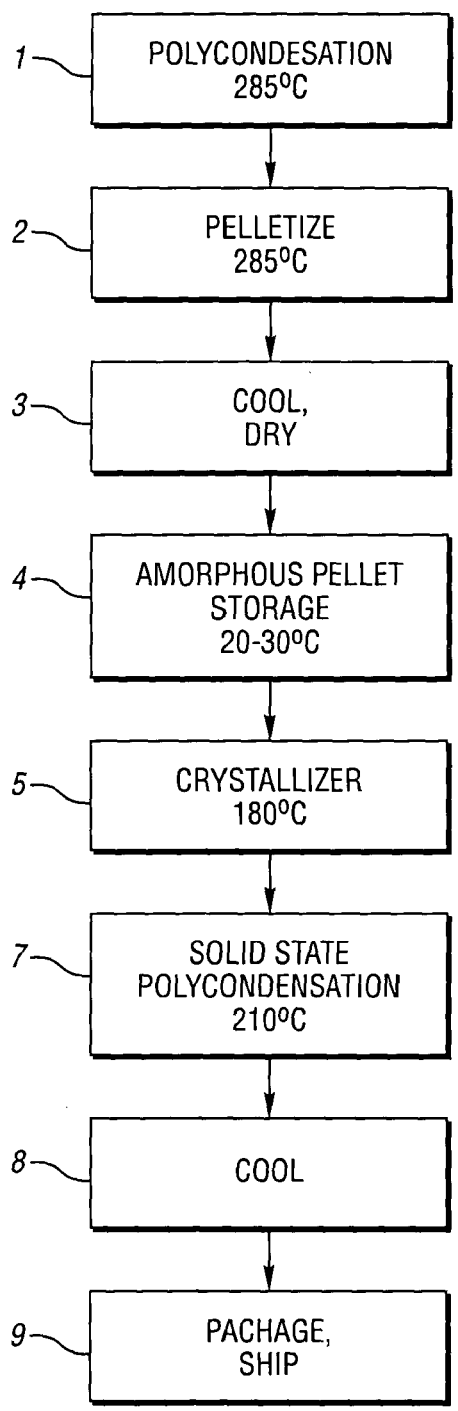
FIG. 1 illustrates the prior art process of solid stating.

The conventional process may be illustrated in block schematic form in FIG. 1. The polycondensation 1 generally takes place at relatively high temperatures, i.e. 260° C. to 300° C., particularly in the last phases, where the temperature is more commonly in the range of 285° C. to 290° C. Polyester exiting the polycondensation reactor is extruded into strands, cooled, and pelletized in pelletizer 2, following which the pellets are further cooled and dried (3). Prior to pelletization, the strands are initially cooled with water. The pellets are now essentially amorphous, and are stored at 20° C. to 30° C. in an amorphous pellet storage silo 4. The relatively low storage temperature has been believed necessary to prevent sintering or agglomeration of the amorphous pellets.

The pellets from the storage silo 4 are then introduced into a crystallizer 5, where they are treated with hot gas for, e.g. 30 to 90 minutes, to convert at least a portion of the amorphous PET to crystalline PET. If not crystallized, the amorphous pellets will agglomerate in the solid stating reactor. The temperature of the crystallizer is generally about 180° C., but higher or lower temperatures may be used as well. The pellets are transported from the crystallizer to the solid state polycondensation reactor 7. The solid stating reactor operates generally at temperatures only slightly below the melt temperature of the polymer, for example about 210° C., and thus require further heating to reach this temperature. Following exit from the solid stating reactor, the hot product pellets, now of higher molecular weight due to the solid stating process, are again cooled 8 with gas, e.g. nitrogen, and then packaged or shipped 9.

Figure 2:
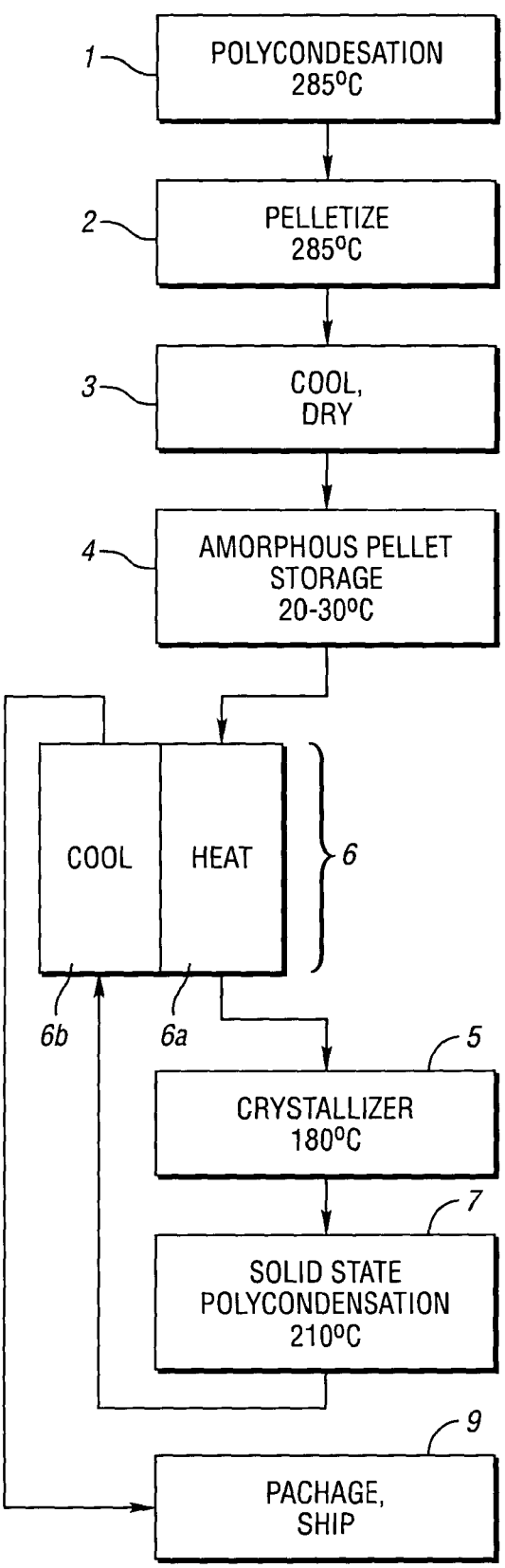
FIG. 2 illustrates one embodiment of a subject invention process.

A preferred embodiment of the subject invention process may be illustrated with reference to FIG. 2. In FIG. 2, the polyethylene terephthalate is processed as in steps 1–4 of FIG. 1, but instead of being directly transported from the amorphous pellet storage silo 4 to the crystallizer 5, the cool pellets first pass through heat exchanger 6, which has at least one heating zone 6a and at least one cooling zone 6b. Hot pellets which exit the solid stating reactor 7 flow through the cooling zone 6b, transferring their heat to heating zone 6a. The amount of heat which must be supplied to the ordinarily cool pellets entering the crystallizer 5 is less by the amount of heat absorbed by the cool pellets in the heat exchanger prior to their entry into the crystallizer.

Figure 3:
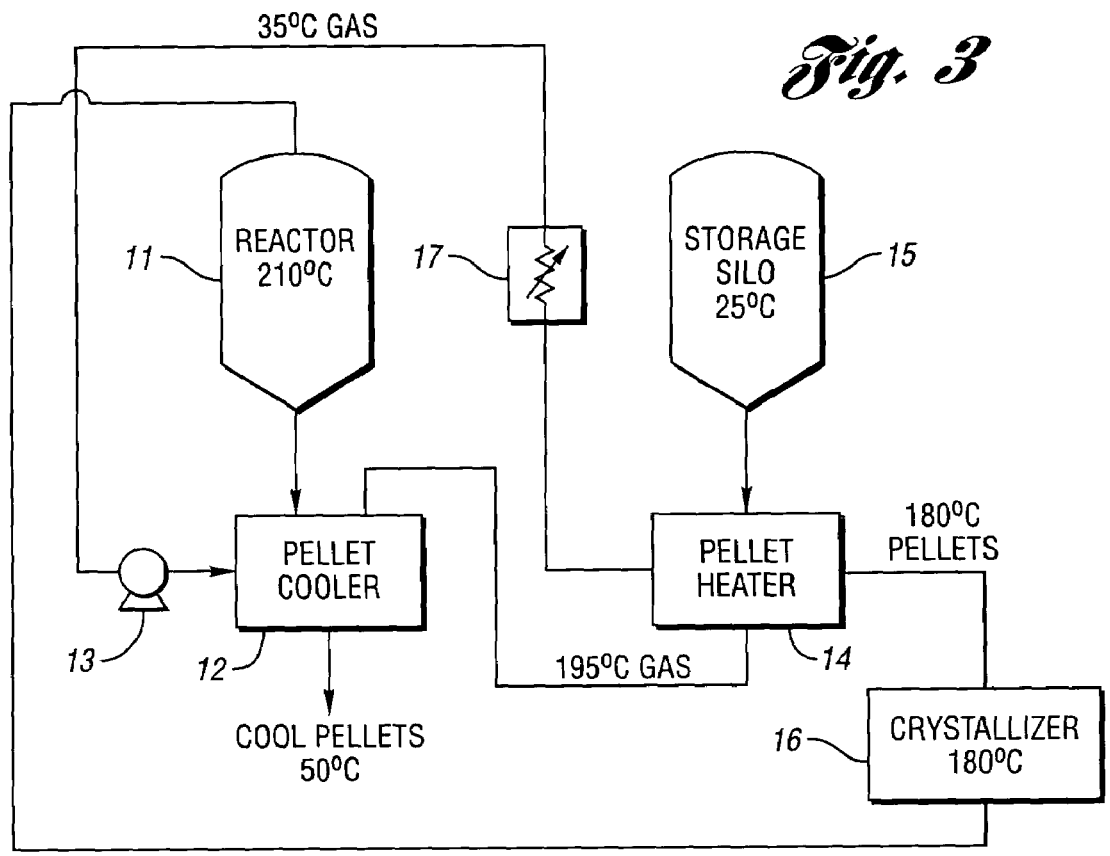
FIG. 3 illustrates a further embodiment of a subject invention process.

A preferred embodiment is depicted in FIG. 3, where pellets exiting a solid state polymerization reactor 11 are routed to a pellet cooler 12 which is supplied with cool gas, e.g. at 35° C., by pump 13. Cool pellets exiting the pellet cooler are nominally at a temperature of 50° C., and are shipped or packaged. Hot gas exiting the pellet cooler, e.g. at a temperature of 195° C., flows to a pellet heater 14 which is supplied with cool, amorphous pellets from storage silo 15. The hot gas heats the cool pellets to ca. 180° C. which then enter the crystallizer 16. Crystallized pellets are then fed to solid state polymerization reactor 11. Warm gas from the pellet heater is directed back to pellet cooler 12. An optional cooler 17 further cools the warm gas, if necessary. The cooler may be a refrigeration-type cooler or a heat exchanger employing river or process water as the coolant.

In a preferred embodiment such as that of FIG. 3, the heat exchanger may consist of a substantially continuous loop of insulated piping, interrupted by any necessary valves, etc., and optionally and preferably used in conjunction with two fluidized beds, one located prior to either or both of the crystallizer or solid stater, and one located subsequent to either or both of the crystallizer or solid stater. The fluidized beds also constitute a portion of the continuous loop. This embodiment also contains particle separators which facilitate separation of particles from the gas stream. Although the cooler and heater are both preferably fluidized bed vessels, stirred vessels may be used in both instances, if desired; the important criterion is sufficient agitation and residence time of pellets and gas to effectuate the desired degree of heat transfer. When appropriate, the "fluidized beds" may be dispensed with, the pellets absorbing or liberating heat as they flow through the piping itself. For example, the pellets to be fed to the crystallizer may be metered into the gas stream exiting from the pellet cooler, and thus heated during transport to the crystallizer.

The advantages of the process of FIG. 3 is that it allows the pellet heater to be at a different location than the pellet cooler. In conventional processes, the cooling gas, e.g. air or nitrogen, is recirculated through a high capacity cooler or vented. In the process of FIG. 3, the cooling gas forms an essentially closed loop. Thus, use of nitrogen gas, which is preferred, can be used economically.

While the invention has been illustrated for utilizing the thermal energy of pellets from the solid state polymerization reactor to preheat pellets prior to their entry into the crystallizer, it is also possible, through the addition of a further pellet heater, to utilize the hot air (e.g. 195° C.) from the polycondensed pellet cooler to initially heat pellets exiting the crystallizer (180°) prior to their entry into the solid state polymerization reactor. The hot air exiting the solid state polymerization reactor pellet feed heater, e.g. at a temperature of about 180–190° C., would then be routed to the crystallizer pellet feed heater.

In production facilities of nominal 200 ton/day capacity where only the solid stating reactor pellet product stream and crystallizer pellet input stream are subject to heat exchange, theoretical energy savings of $50\times10^6$ BTU/day ($5.3\times10^4$ MJoule/day, $5.3\times10^{10}$ J=$5.3\times10^4$ MJ) is theoretically possible. When considering loss of efficiency during heat exchange due to mechanical and heat losses, a realistic savings of $30-40\times10^6$ BTU/day (3.2–4.2 MJoule/day) is entirely feasible.

The mechanism of heat exchange is not critical to the functioning of the process, and in principle, any means may be used. Most preferably, where equipment space and location permits, tube-within-tube, plate-type ("plate-plate"), plate and shell heat exchanges, and similar "static" devices are preferably used, and are commercially available. Plate-type heat exchangers are commonly used for cooling fertilizer prills, for example, and consist of a plurality of parallel partitions. Pellets to be heated flow through alternating partitions, while pellets to be cooled flow through the partitions in between. Concurrent or countercurrent flow may be used. Upwards flow may be assisted by a stream of gas, which may be recirculated. If the packing density of downward flowing pellets is high, it is preferable in some cases, such as the heating of pellets before introduction to the crystallizer, to maintain the pellets in a fluidized or agitated state by passage of gas through the pellets in an upwards direction.

Figure 4:
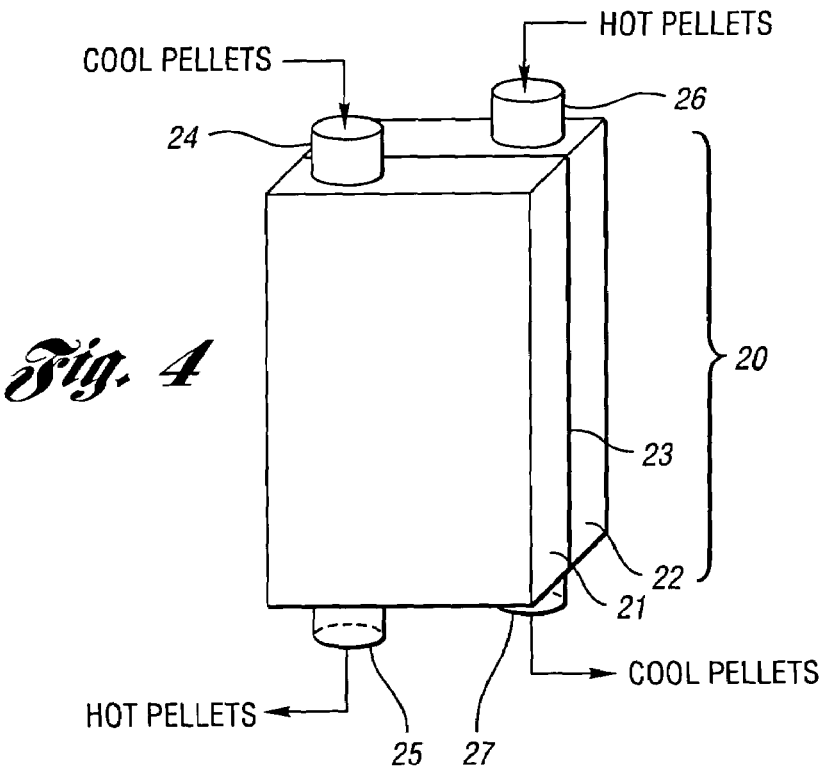
FIG. 4 illustrates a plate-type heat exchanger useful in processes of the subject invention.

A simplified version of a two layer plate type heat exchanger is shown in FIG. 4. The heat exchanger 20 consists of two parallel chambers 21, 22, separated by partition 23. Cool pellets enter the heating chamber 21 through inlet 24, and exit as hot pellets at outlet 25, while hot pellets enter inlet 26 and exit as cool pellets from outlet 27. In practice, the heat exchanger would consist of a plurality of alternating pairs of heating/cooling chambers, and the common inlets and outlets would be manifolded together. A series of baffles within the partitions may be used to redirect pellet flow towards the walls of the heat exchanger and to increase dwell time, as may also plates which are stamped to provide surface irregularities. In a preferred embodiment, two plate type heat exchangers are employed, one for cooling pellets, and one for heating pellets, with a common fluid used for heat exchange between the two exchangers.

In a yet simpler heat exchanger, a single chamber may be used as either a warming or cooling chamber, with a plurality of spaced apart, parallel chambers serving as cooling or warming chambers, i.e. a plate and shell exchanger. Both these latter types of heat exchangers offer the advantages of simple and robust construction, and large surface area for efficient heat exchange. The material of construction is preferably stainless steel, although carbon steel may be employed as well. Both these types of heat exchanges, where the heating and cooling functions are performed in the same device, are termed "direct contact" heat exchangers herein.

If desired, or if existing plant configurations do not allow space for direct contact heat exchangers, remote contact exchangers employing a liquid working fluid or exchangers such as refrigerant type heat exchangers may be used. In the latter heat exchangers, a working fluid is vaporized by the heat from hot pellets and conveyed to the location where heating of pellets is desired, where the vapor condenses back to a liquid, as in a typical heat pump. Heat exchange to the working fluid may be by a plate and shell heat exchanger, etc., but one which is smaller than that which would be required by direct contact of hot and cold pellets as described previously. In another embodiment, a liquid which is relatively non-volatile may be used to transfer heat from one heat exchanger to another. In a further embodiment, as previously indicated, the heat transfer may take place with gaseous media, i.e. air, nitrogen, etc., which may be heated or cooled as necessary. Thus, cooling of hot pellets and heating of cool pellets may take place in a device having heat exchangers physically located in the same device, or positioned remote from each other.

Depending upon the efficiency of the various heat exchangers, transmissive loss of heat to the outside, and other factors, it may be necessary to employ heaters or coolers in portions of the heat transfer fluid lines. Such heaters and coolers will lower the energy recovery achieved by the system, and should be avoided as possible. The more efficient the heat exchangers, the less likely the need for any additional heating or cooling. However, heat exchanger efficiency is generally proportional to size, and hence some compromise in efficiency will ordinarily be expected. It is for these reasons that the expected energy savings is less than that theoretically obtainable.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process for minimizing energy consumption during the production of polyethylene terephthalate where amorphous pellets are crystallized at elevated temperature and subsequently introduced into a solid state polymerization reactor, comprising removing heat from hot pellets from the solid state polymerization reactor, transferring heat removed to heat cool pellets which constitute a feed to a crystallizer.

2. The process of claim 1, wherein a heat exchanger is employed, wherein hot pellets exiting a solid state polymerization reactor are introduced into a cooling zone of a first heat exchanger and cool pellets to be introduced into a crystallizer are introduced into a heating zone of a second heat exchanger, heat removed from hot pellets in said first heat exchanger supplied to said second heat exchanger.

3. The process of claim 2 wherein said first heat exchanger and said second heat exchanger are physically located in one device.

4. The process of claim 2, wherein said heat exchanger is a direct contact heat exchanger.

5. The process of claim 2, wherein said heat exchanger is a plate-plate heat exchanger.

6. The process of claim 2, wherein said heat exchanger is a plate and shell heat exchanger.

7. The process of claim 2, wherein pellet flow in at least one portion of said heat exchanger is accompanied with a concurrent or countercurrent flow of gas.

8. The process of claim 2, wherein said heat exchanger is a remote contact heat exchanger.

9. The process of claim 2, wherein said heat exchanger comprises a heating zone located remote from a cooling zone, and heat is transferred from said cooling zone to said heating zone by means of a fluid.

10. The process of claim 9, wherein said fluid is a gas which traverses said heating zone and said cooling zone in a closed loop.

11. The process of claim 10, wherein cooled pellets are mechanically separated from heated gas in or after a cooling zone and said heated gas entrains cool pellets in or before a heating zone.

12. The process of claim 10, wherein said heat exchanger comprises a continuous loop of piping through which said gas is circulated.

13. The process of claim 12, wherein said continuous loop of piping has contained therein or is interrupted by at least one pellet separator which separates pellets from flowing gas.

14. The process of claim 9, wherein hot pellets are cooled by a stream of gas in a fluidized or agitated bed, and the stream of gas is directed to a further fluidized bed in which cool pellets are heated by said gas.

15. The process of claim 14, wherein said stream of gas and said fluidized beds constitute a continuous loop through which said gas is circulated.

16. The process of claim 1, wherein a portion of heat removed from pellets exiting the solid state polymerization reactor is used to heat pellets exiting a crystallizer prior to their entry into a solid state polymerization reactor, and a remaining portion of said heat removed is used to heat pellets prior to entry into said crystallizer.

* * * * *